(12) United States Patent
Ghoshal

(10) Patent No.: US 12,462,833 B1
(45) Date of Patent: Nov. 4, 2025

(54) ALTERNATIVE ALIGNMENT TECHNIQUE FOR SEMICONDUCTOR DEVICE TRANSFER PRINT PROCESS

(71) Applicant: Seagate Technology LLC, Fremont, CA (US)

(72) Inventor: Sayak Ghoshal, Londonderry (GB)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 386 days.

(21) Appl. No.: 18/308,519

(22) Filed: Apr. 27, 2023

Related U.S. Application Data

(60) Provisional application No. 63/366,856, filed on Jun. 23, 2022.

(51) Int. Cl.
   G11B 5/127 (2006.01)
   G11B 5/00 (2006.01)

(52) U.S. Cl.
   CPC .... G11B 5/1272 (2013.01); *G11B 2005/0021* (2013.01)

(58) Field of Classification Search
   CPC ............ G11B 2005/0021; G11B 5/314; G11B 5/6088; G11B 5/4866; G11B 5/3106; G11B 5/3163; G11B 7/1387; G11B 13/08; G11B 5/3116; G11B 5/40; G11B 5/65; G11B 7/24059; G11B 5/187; G11B 13/045; G11B 5/1272; G11B 9/12; G02B 6/1226; G02B 2006/12157; G02B 6/4208; G02B 6/12002

USPC .......... 438/21, 106, 107; 360/59; 29/603.01
See application file for complete search history.

(56) References Cited

U.S. PATENT DOCUMENTS

| | | | |
|---|---|---|---|
| 8,501,536 B2 * | 8/2013 | Mooney ............... | G11B 5/3173 438/455 |
| 10,069,029 B1 * | 9/2018 | Olson .................... | H10F 77/413 |
| 10,783,917 B1 * | 9/2020 | Goggin .................. | G11B 5/314 |
| 10,861,489 B1 * | 12/2020 | Habibi .................. | H01S 5/0225 |
| 10,984,821 B1 * | 4/2021 | Gubbins ................. | G11B 3/10 |
| 11,069,376 B1 * | 7/2021 | McGurk .............. | G11B 5/6088 |
| 2019/0058080 A1 | 2/2019 | Ahmed et al. | |
| 2021/0225679 A1 | 7/2021 | Luan et al. | |

\* cited by examiner

*Primary Examiner* — Didarul A Mazumder

(57) ABSTRACT

A method of aligning a semiconductor device for use in a storage device disclosed herein includes providing a semiconductor device on a first substrate. The first substrate includes a first alignment mark. A recording head comprising a second alignment mark is provided on a second substrate. A transfer print head comprising a third alignment mark is also provided. The transfer print head is aligned to the semiconductor device on the first substrate. After the transfer print head is aligned to the semiconductor device, the semiconductor device is transfer printed from the first substrate onto the second substrate. The transfer printing includes aligning the third alignment mark on the transfer print head to the second alignment mark on the second substrate.

18 Claims, 8 Drawing Sheets

ALTERNATIVE ALIGNMENT TECHNIQUE FOR SEMICONDUCTOR DEVICE TRANSFER PRINT PROCESS

This application claims priority to U.S. Provisional Patent Application Ser. No. 63/366,856 entitled "ALTERNATIVE ALIGNMENT TECHNIQUE FOR SEMICONDUCTOR DEVICE TRANSFER PRINT PROCESS" and filed Jun. 23, 2022, the entire contents of which are hereby incorporated by reference.

BACKGROUND

Some hard disk drives (HDDs) use heat assisted magnetic recording (HAMR) technology to store information. HDDs using HAMR technology typically utilize a laser to heat a small spot on a magnetic media. Heating the magnetic media reduces the coercivity of the magnetic media, which enables a write head to change the magnetization direction of a bit and thus store information to the magnetic media. A HAMR head includes a waveguide that guides a laser beam from the laser to a near-field transducer that shapes and directs the energy from the laser to the magnetic media. In some cases, the HAMR head and laser are formed using separate processes, such that alignment of the laser to the waveguide during assembly can be challenging. Though the electrical components of the HAMR device may still operate if misaligned, misalignment between the laser and the waveguide can result in a loss of optical efficiency.

SUMMARY

The present disclosure relates to a method of aligning a semiconductor device and a recording head. In one example, the method includes transfer printing a semiconductor device to a HAMR recording head wafer. In some examples the semiconductor device is a laser diode. In the example of a laser diode, the placement of the laser diode on the HAMR recording head wafer defines the alignment between the laser diode and the waveguide of the HAMR recording head. The accuracy of this alignment may impact the laser to waveguide coupling efficiency and output power and subsequently, the reliability of the HAMR recording head. Known transfer print techniques rely on a single alignment between the semiconductor device and the HAMR recording head wafer only. According to techniques of the present disclosure, a 2-step alignment method is used. The 2-step alignment method comprises a first alignment between a transfer print head and the semiconductor device by way of alignment marks on both the transfer print head and the semiconductor device substrate. A second alignment step occurs during the process of transferring the semiconductor device to the HAMR recording head wafer. This two-step alignment process may improve the alignment of the semiconductor device alignment to the HAMR recording head, which may improve optical efficiency of the HAMR device.

In one example, a method of aligning a semiconductor device for use in a storage device is described. The method includes providing a semiconductor device on a first substrate, wherein the first substrate includes a first alignment mark. A recording head including a second alignment mark is provided on a second substrate. A transfer print head including a third alignment mark is also provided. The transfer print head is aligned to the semiconductor device on the first substrate. After alignment, the semiconductor device is transfer printed from the first substrate onto the second substrate. The transfer printing includes aligning the third alignment mark on the transfer print head to the second alignment mark on the second substrate.

These and other features and aspects of various examples may be understood in view of the following detailed discussion and accompanying drawings.

DETAILED DESCRIPTION

Figure 1A:
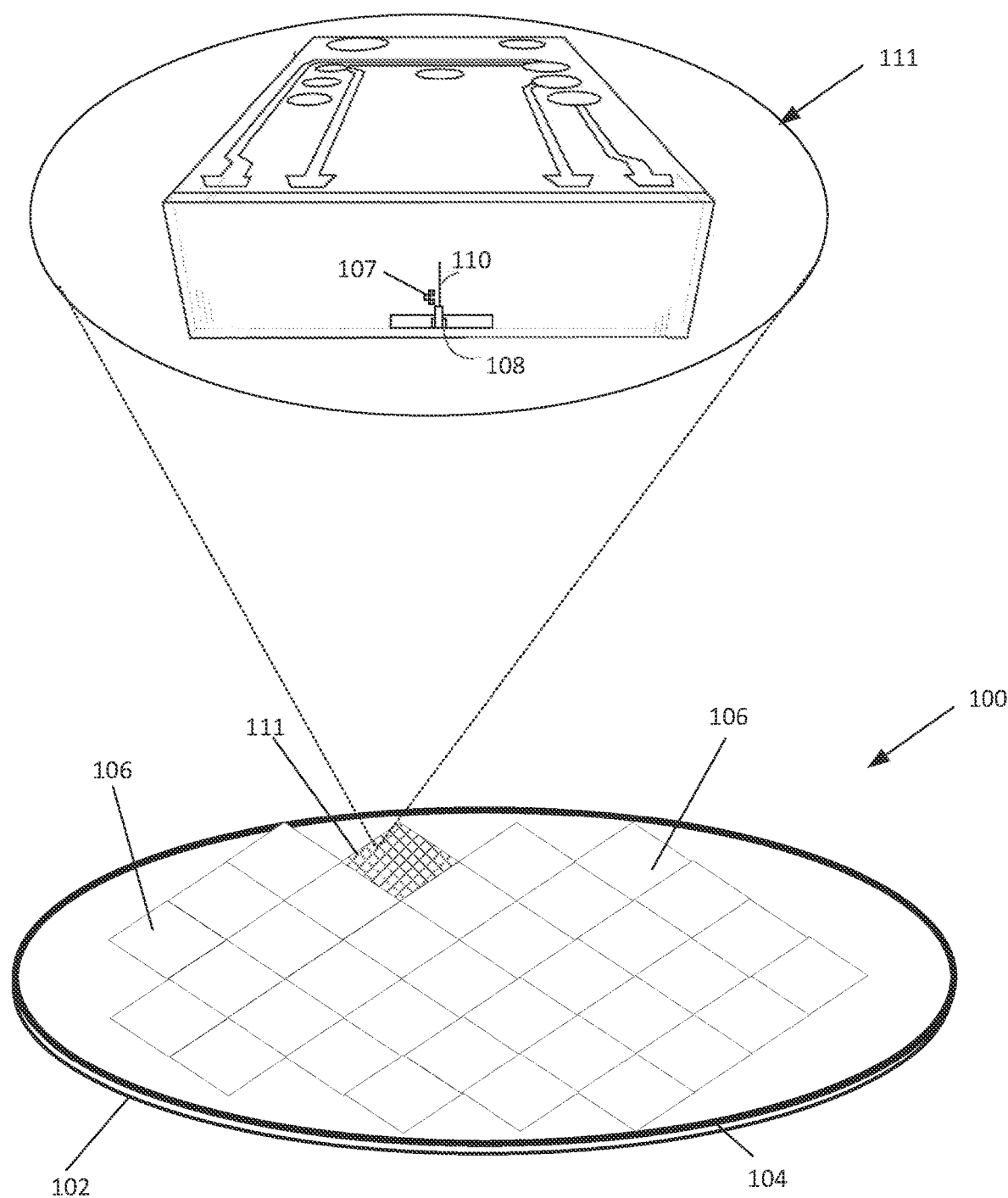
FIG. 1A is a perspective schematic view of an example recording head wafer which includes one or more HAMR recording heads.

FIG. 1A is a perspective schematic view of an example recording head wafer which includes one or more recording heads. In FIG. 1A, a HAMR recording head wafer 100 includes substrate 102 on which a plurality of thin layers 104 have been formed and patterned in a rectangular array of wafer die 106, using a sequence of known fabrication steps. Substrate 102 is a self-supporting substrate, meaning that it has mechanical integrity sufficient to permit handling of the substrate without undue breakage or other damage. Substrate 102 may be a composite material such as AlTiC that includes aluminum oxide and titanium carbide. Thin layers 104 may include multiple layers which have been patterned and otherwise processed to provide a magnetic device. Thin layers 104 may include magnetic materials (e.g., Co, Fe, Ni, or combinations thereof) or other metallic or non-metallic materials. Wafer die 106 of the HAMR recording head wafer 100 may be arranged in a rectangular array or other type of arrangement when viewing the wafer from above or in plan view. Wafer die 106 includes a plurality of sliders 111. In the example of FIG. 1A, slider 111 includes alignment mark 107, recording head 108, and waveguide 110.

Figure 1B:
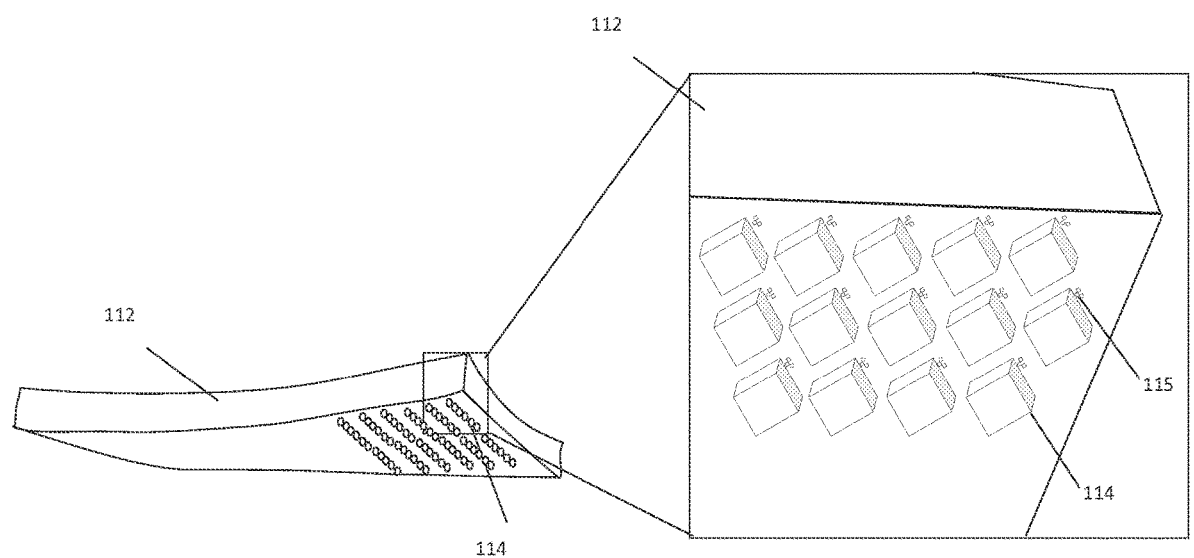
FIG. 1B is a schematic view of an example substrate which includes one or more semiconductor devices.

FIG. 1B is a schematic view of an example substrate which includes one or more semiconductor devices. In FIG. 1B, substrate 112 includes a plurality of semiconductor devices 114 and a plurality of alignment marks 115. Examples of semiconductor devices include metal-oxide semiconductor field effect transistors (MOSFETs), light-emitting diodes, photocells, solar cells, schottky diodes and transistors, among others. In some examples, semiconductor devices 114 are laser diodes and may be used in a storage device (e.g., a HAMR recording head). Substrate 112 may include multiple epitaxially grown layers of semiconductor material such as GaAs, AlGaAs or combinations thereof. Semiconductor devices 114 may be formed on substrate 112 via photolithography and/or other processing steps to attain a final shape and position on substrate 112. Semiconductor devices 114 can include a stack of epitaxial layers formed on substrate 112. A sacrificial layer may also be included between semiconductor devices 114 and substrate 112 to allow separation of the semiconductor devices 114 from substrate 112. In some examples, semiconductor devices 114 may be fully operational semiconductor devices. In other examples, semiconductor devices 114 may be partially manufactured semiconductor devices. Partially manufactured semiconductor devices may undergo subsequent processing steps after a transfer printing process (e.g., transfer printing process illustrated in FIGS. 2A-2E) to become fully operational.

In some cases, parts of semiconductor device 114, are incompatible with epitaxial growth on substrate 102. As such, semiconductor device 114 cannot be formed using the same layer deposition processes used to form recording head 108, and waveguide 110. In the examples described below, semiconductor devices 114 may be formed first on substrate 112 and transferred to substrate 102 by a transfer process, such as a transfer-printing process.

Figure 2A:
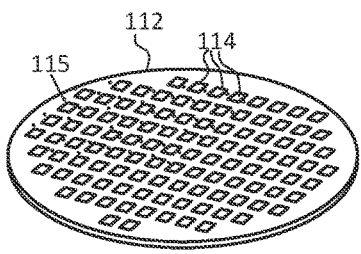
FIGS. 2A-2E show an example transfer printing process, according to various aspects of the present disclosure.
Figure 2B:
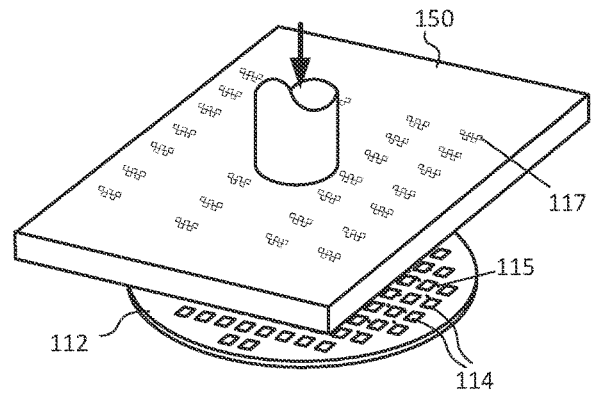
Figure 2C:
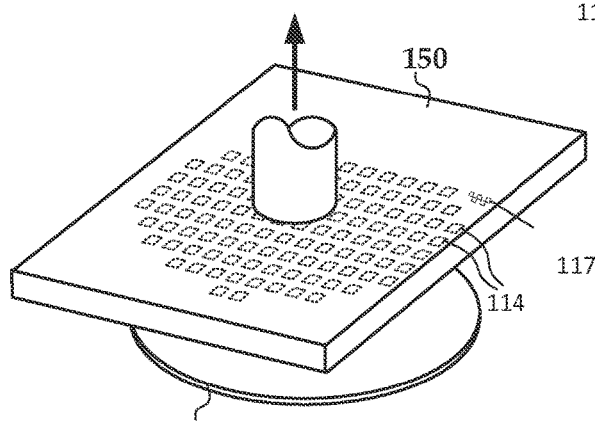
Figure 2D:
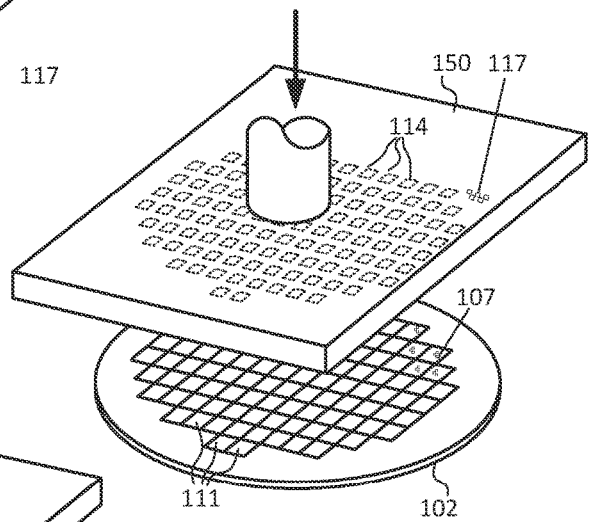
Figure 2E:
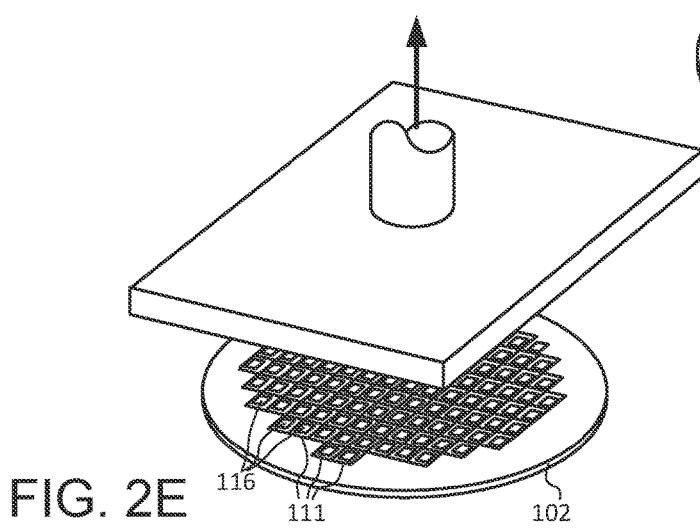

FIGS. 2A-2E show an example transfer printing process, according to various aspects of the present disclosure. FIG. 2A illustrates substrate 112 which includes a plurality of semiconductor devices 114 and a plurality of alignment marks 115. FIG. 2B illustrates transfer print head 150, a plurality of alignment marks 117 and substrate 112. Substrate 112 includes semiconductor devices 114 and alignment marks 115. In the example of FIG. 2B, transfer print head 150 is moved towards substrate 112. Alignment marks 117 are embedded in transfer print head 150 and align with alignment marks 115 on substrate 112. Following this alignment process, transfer print head 150 is then lifted, as shown in FIG. 2C, taking semiconductor devices 114 with it. In this way, a plurality of semiconductor devices 114 can be aligned and transferred to substrate 102, as illustrated in FIGS. 2D-2E.

In the example of FIG. 2D, transfer print head 150 is moved over substrate 102 that includes sliders 111 and alignment marks 117. Alignment marks 117 on transfer print head 150 align with alignment marks 107 on substrate 102. The surface of substrate 102 is prepared to receive semiconductor devices 114. In some examples, the surface of substrate 102 may include a material suitable for surface bonding and/or have preferred electrical, thermal, or thermochemical characteristics. Following alignment between alignment marks 117 and alignment marks 107, transfer print head 150 presses the semiconductor devices 114 onto substrate 102 and is then moved away as shown in FIG. 2E. This attaches semiconductor devices 114 to sliders 111 to form integrated semiconductor devices 116.

In the example where semiconductor device 114 is a laser diode, integrated semiconductor device 116 is an integrated laser diode. One challenge in forming an integrated laser diode is the precise alignment needed between the laser diode and the waveguide of a write head. Though electrical components can operate if misaligned, misalignment between a laser and a write head can result in loss of optical efficiency. Loss of optical efficiency may render the integrated laser unusable.

Figure 3:
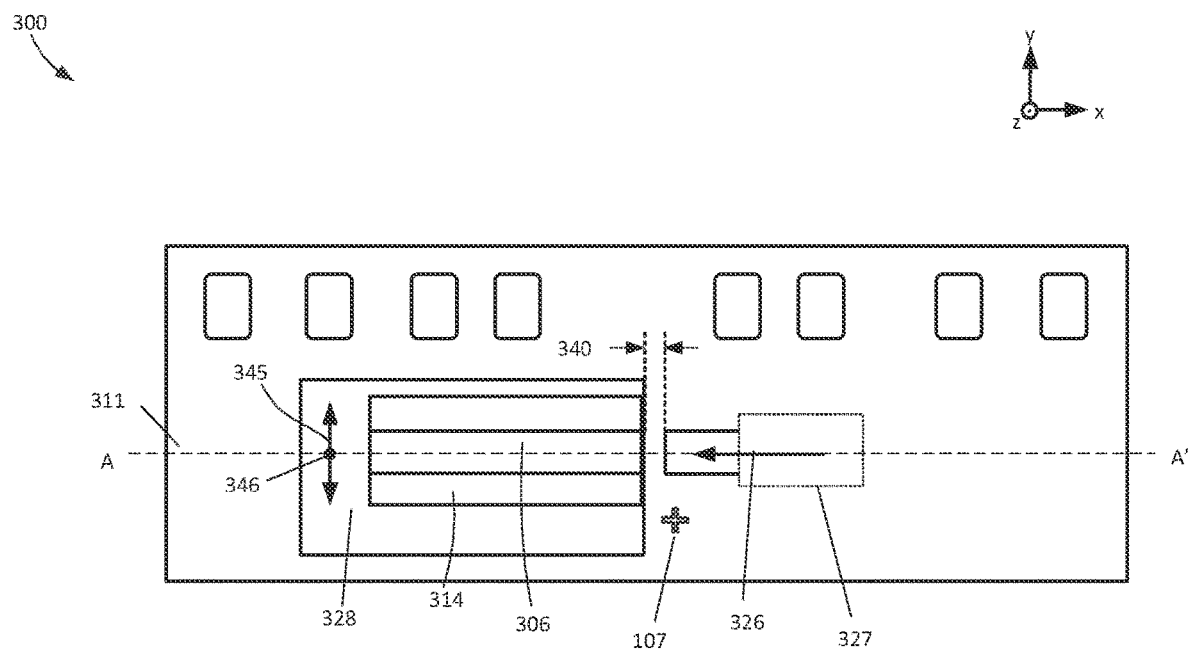
FIG. 3 is a top-down view of an integrated laser diode, according to various aspects of the present disclosure.

FIG. 3 is a top-down view of a slider, according to various aspects of the present disclosure. Slider 300 is an example of slider 111 of FIG. 1. Slider 300 includes laser diode 314, laser ridge 306, cavity 328, alignment mark 107, recording head 327 and waveguide 326. Laser diode 314 is an example of a semiconductor device (e.g., semiconductor device 114 of FIG. 1B). In some examples, recording head 327 is aligned to alignment mark 107 in both the x-direction and the y-direction. In some examples, the target alignment offset of recording head 327 to alignment mark 107 in the x-direction is 0 nm but may range from about-100 nm to about +100 nm in the x-direction. In some examples, the target alignment error of recording head 327 to alignment mark 107 in the y-direction is 0 nm but may range from about-200 nm to about +200 nm in the y-direction. The term "about" as used herein means approximately or nearly and in the context of a numerical value or range, means a variation of +/−20% or less. For example, a value differing by +/−19%, +/−15%, +/−10%, +/−5%, +/−1% would satisfy the definition of "about".

In the example of FIG. 3 laser diode 314 is positioned in cavity 328 of slider 300. The placement of laser diode 314 in cavity 328 contributes to the relative alignment of laser ridge 306 to waveguide 326 in both the x-direction and the y-direction. The relative alignment of laser diode 314 to waveguide 326 in the x-direction is illustrated by gap 340. The target size of gap 340 is determined by, for example, the wavelength of the light emitted from laser diode 314 or by the refractive properties of the materials used in slider 300. Variation in placement of laser diode 314 in cavity 328 in the x-direction during the transfer printing process (e.g., transfer printing process 200 of FIG. 2) may impact alignment of laser diode 314 to waveguide 326 in the x-direction.

In the example of FIG. 3 relative alignment of laser ridge 306 with waveguide 326 in the y-direction is represented by arrow 345 which is centered in the y-direction on reference line A-A' at point 346. Variation in placement of laser diode 314 in cavity 328 in the y-direction during the transfer printing process (e.g. transfer printing process 200 of FIG. 2) may impact alignment of laser ridge 306 to waveguide 326 in the y-direction. The target alignment in the y-direction of laser ridge 306 to waveguide 326 is along line A-A' and corresponds to an alignment error of zero.

Figure 4:
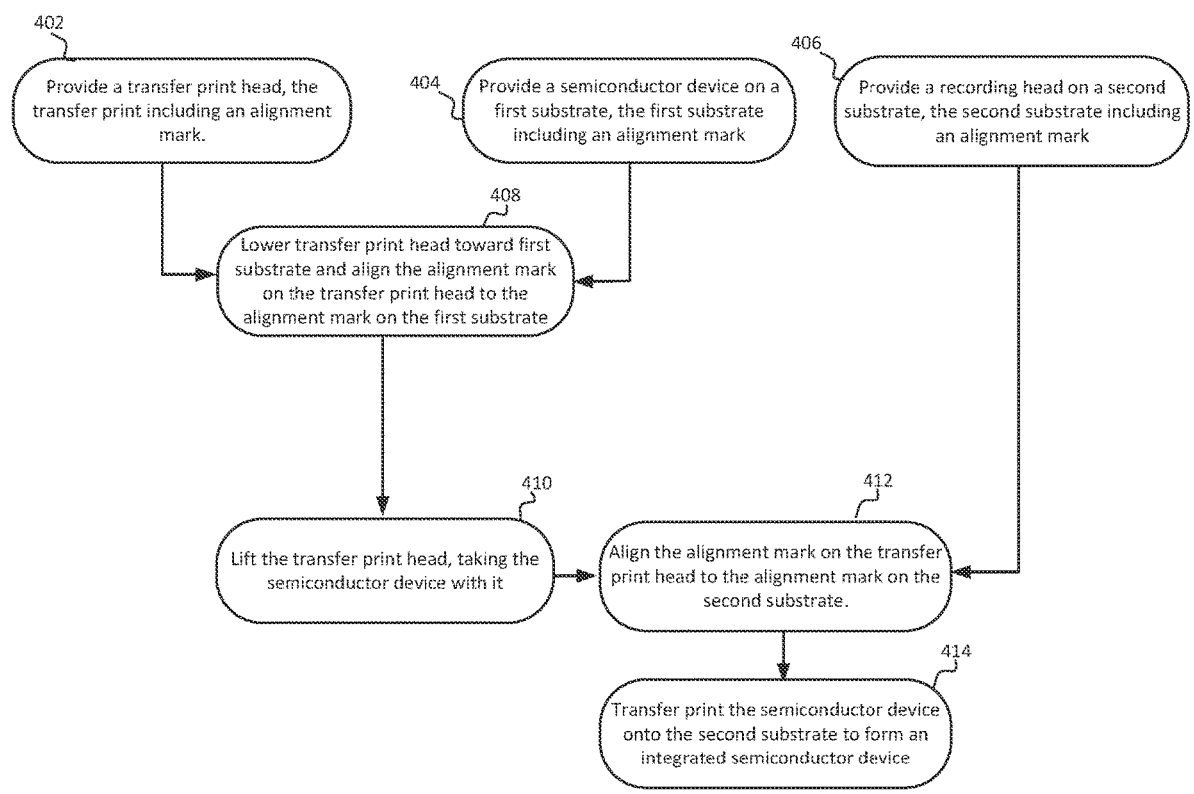
FIG. 4 is a flow diagram of a method of alignment in a transfer print process, according to various aspects of the present disclosure.

FIG. 4 is a flow diagram of a method of alignment in a transfer print process, according to various aspects of the present disclosure. The flow chart in FIG. 4 is described in reference to FIG. 1-FIG. 3.

A transfer print head 150 including an alignment mark 117 is provided (in step 402). A semiconductor device 114 on a substrate 112 is provided (in step 404). Substrate 112 includes alignment mark 115. Substrate 112 may include multiple epitaxially grown layers of semiconductor material such as GaAs, AlGaAs, or combinations thereof. Semiconductor device 114 may be formed on substrate 112 via photolithography and/or other processing steps to attain a final shape and position on substrate 112.

Transfer print head 150 is moved towards substrate 112 (in step 408). Alignment mark 117 embedded in transfer print head 150 is aligned with alignment mark 115 on substrate 112 (in step 408). Following this alignment process, transfer print head 150 is then lifted, taking semiconductor device 114 with it (in step 410).

A recording head 108 on a substrate 102 is provided (in step 406). Substrate 102 includes alignment mark 107. Substrate 102 is a self-supporting substrate, meaning that it has mechanical integrity sufficient to permit handling of the substrate without undue breakage or other damage. Substrate 102 may be a composite material such as AlTiC that includes aluminum oxide and titanium carbide. Thin layers 104 may include multiple layers which have been patterned and otherwise processed to provide a magnetic device.

Alignment mark 117 on transfer print head 150 is aligned with alignment mark 107 on substrate 102 (in step 412). The surface of substrate 102 is prepared to receive semiconductor device 114. In some examples, the surface of substrate 102 may include a material suitable for surface bonding and/or have preferred electrical, thermal, or thermochemical characteristics. Following alignment between alignment mark 117 and alignment mark 107, transfer print head 150 presses the semiconductor device 114 onto substrate 102. This attaches semiconductor device 114 to slider 111 to form integrated semiconductor devices 116 (in step 414).

Figure 5A:
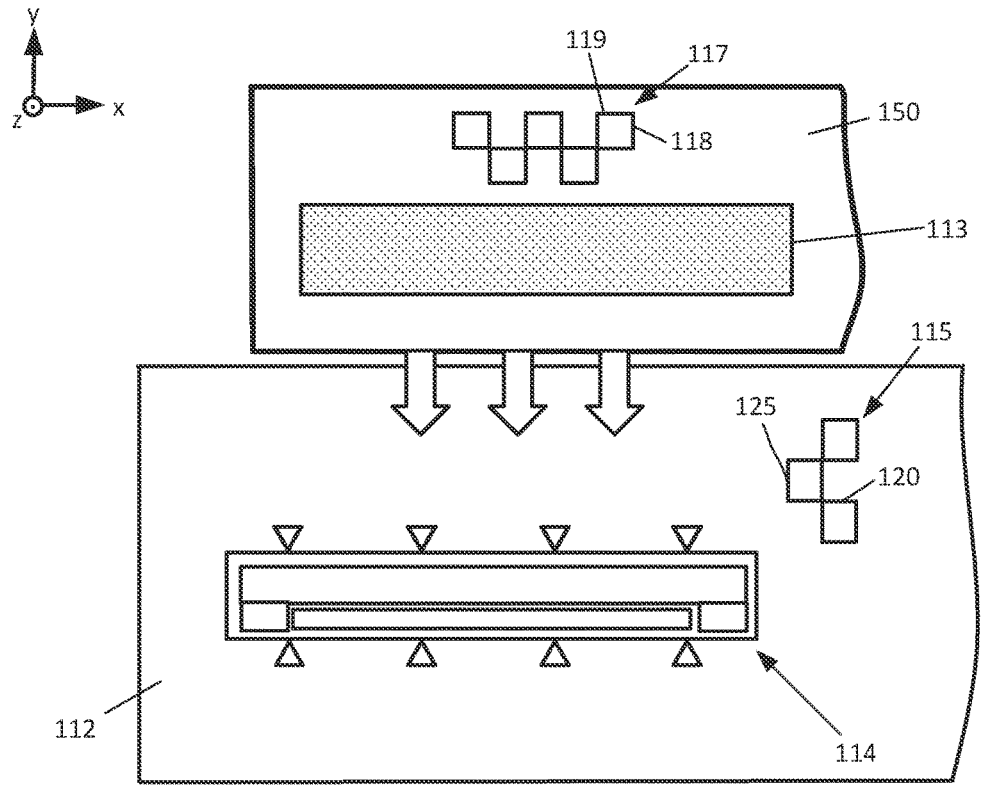
FIGS. 5A-5E show a method of alignment in a transfer print process, according to various aspects of the present disclosure.

FIGS. 5A-5E illustrate a method of alignment in a transfer print process, according to various aspects of the present disclosure. FIG. 5A includes transfer print head 150, stamp 113, alignment mark 117, substrate 112, alignment mark 115 and semiconductor device 114. Alignment marks 115 and 117 include a series of vertical edges (e.g., edges 125 and 118) and horizontal edges (e.g., edges 120 and 119).

In the example of FIG. 5A, transfer print head 150 is moved toward substrate 112 and semiconductor device 114. Alignment mark 117 on transfer print head 150 aligns with alignment mark 115 on substrate 112. Aligning alignment mark 117 with alignment mark 115 aligns transfer print head 150 with semiconductor device 114. Alignment of alignment marks 117 with alignment marks 115 may be performed by any appropriate alignment technique known in the art. In some examples, optical pattern recognition techniques may be used. Alignment marks 115 may comprise Au among other materials. Alignment marks 117 may comprise polydimethylsiloxane (PDMS), among other materials.

Figure 5B:
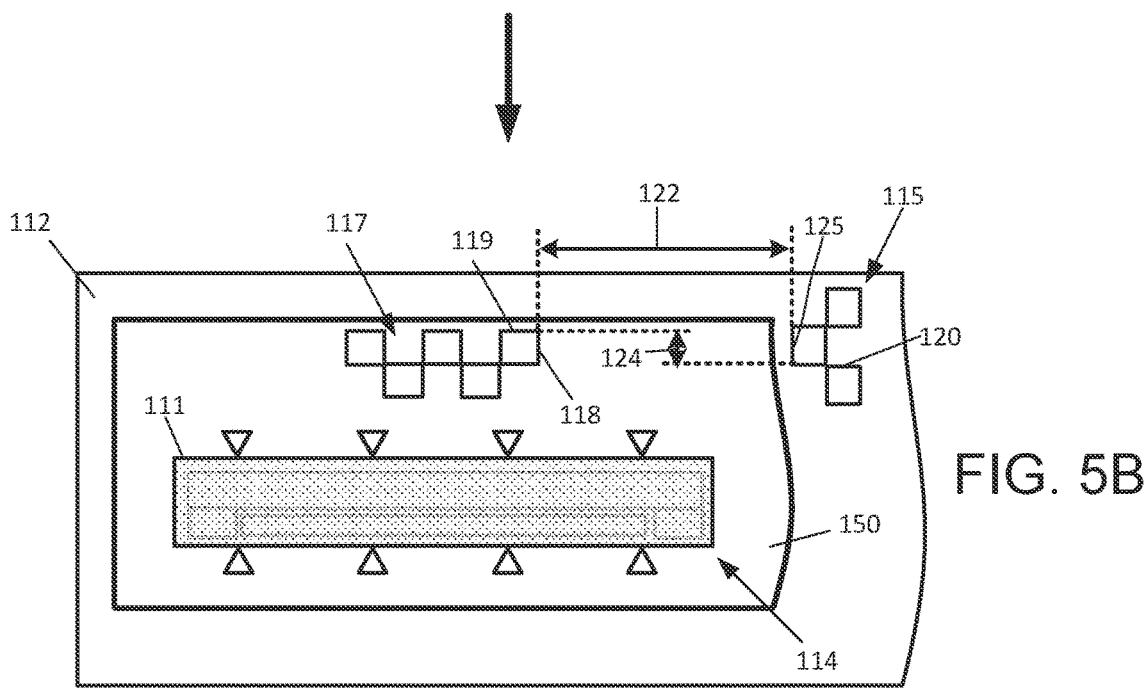

FIG. 5B illustrates a top-down view of transfer print head 150 over substrate 112. In the example of FIG. 5B, alignment mark 115 and alignment mark 117 may be used to define a "training image" for use in optical pattern recognition. Alignment marks 115 and 117 may include any number of edges (e.g., vertical edges 125 and 118 and horizontal edges 119 and 120) and may be any shape. Increasing the number of edges on alignment marks 115 and 117 may improve the accuracy of pattern recognition. In the example of FIG. 5B, edges 118 and 125 can be used to determine the relative placement of transfer print head 150 in the x-direction, as illustrated by horizontal line 122. Edges 119 and 120 can be used to determine the relative placement of transfer print head in the y-direction, as illustrated by vertical line 124. In some examples, transfer print head 150 may be shifted in the x-direction or in the y-direction relative to substrate 112 after optical pattern recognition. Shifting transfer print head 150 in the x-direction or in the y-direction relative to substrate 112 may improve the accuracy of alignment of transfer print head 150 with semiconductor device 114. In some examples, alignment of transfer print head 150 to semiconductor device 114 is from about −200 nm to about +200 nm in the x-direction and from about-200 nm to about +200 nm in the y-direction.

Figure 5C:
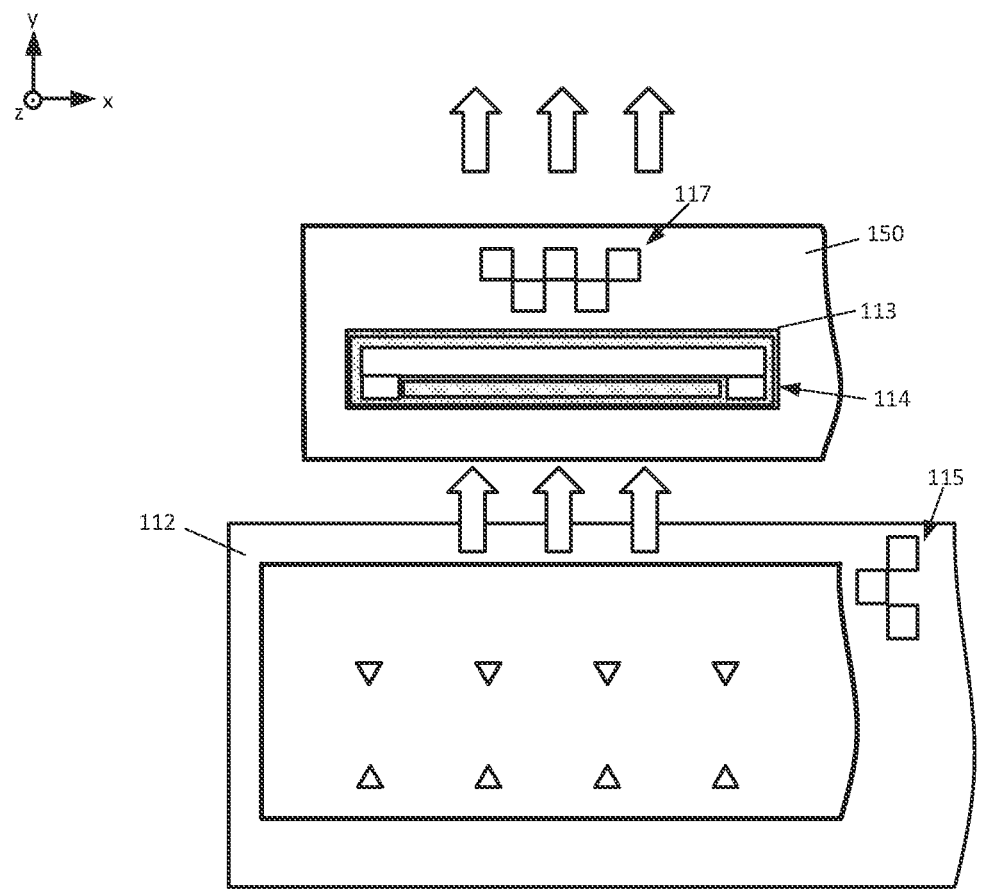

FIG. 5C includes transfer print head 150, semiconductor device 114, stamp 113, substrate 112 and alignment marks 115 and 117. Following alignment of transfer print head 150 with semiconductor device 114, transfer print head 150 is moved away from substrate 112, taking semiconductor device 114 with it, as illustrated in FIG. 5C.

Figure 5D:
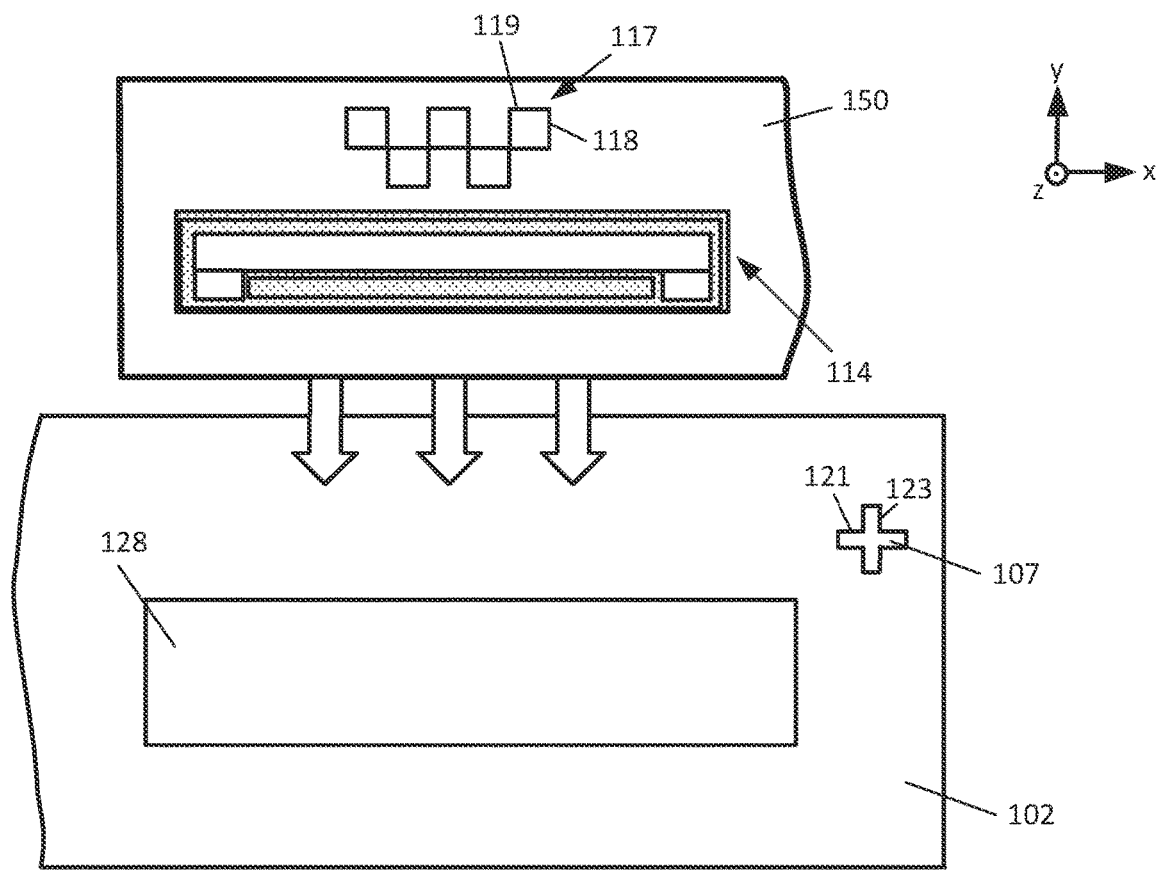

FIG. 5D includes transfer print head 150, alignment mark 117, semiconductor device 114, substrate 102, cavity 128 and alignment mark 107. Alignment mark 117 includes horizontal edge 119 and vertical edge 118. Alignment mark 107 includes horizontal edge 121 and vertical edge 123. In the example of FIG. 5D, transfer print head 150 is moved toward substrate 102 and cavity 128. Alignment mark 117 on transfer print head 150 aligns with alignment mark 107 on substrate 102. Aligning alignment mark 117 with alignment mark 107 aligns transfer print head 150 with substrate 102. Alignment of alignment mark 117 with alignment mark 107 may be performed by any appropriate alignment technique known in the art. In some examples, optical pattern recognition techniques may be used. Materials used to fabricate alignment mark 107 may comprise Au, Ir, or NiFe, among other materials that provide good optical contrast.

Figure 5E:
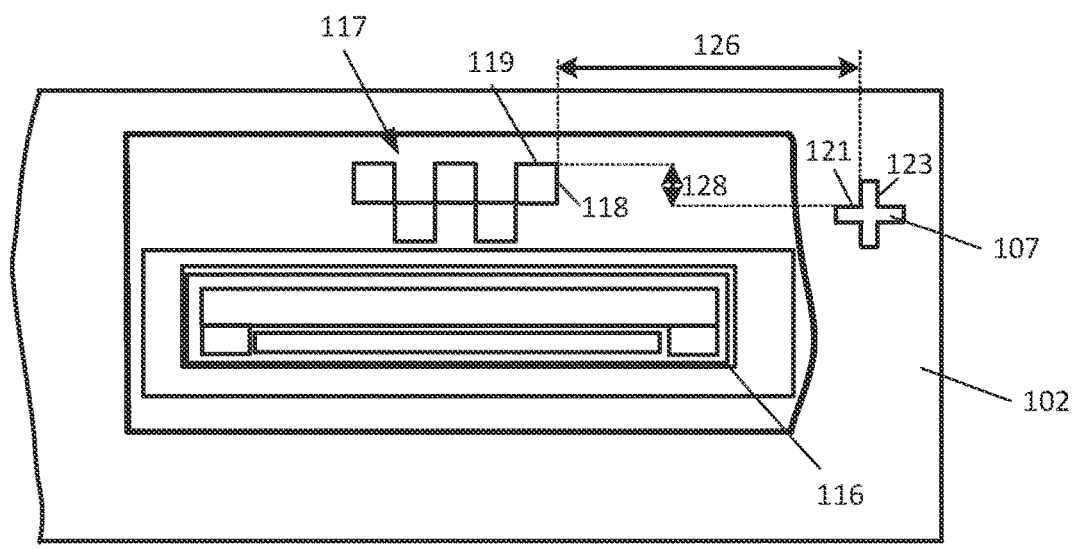

FIG. 5E illustrates a top-down view of transfer print head 150 over substrate 102. In the example of FIG. 5E, alignment mark 117 and alignment mark 107 may be used to define a "training image" for use in optical pattern recognition. Alignment marks 107 and 117 may include any number of edges (e.g., vertical edges 118 and 123 and horizontal edges 119 and 121) and may be any shape. Increasing the number of edges on alignment marks 117 and 107 may improve the accuracy of pattern recognition. In the example of FIG. 5E, edges 118 and 123 can be used to determine the relative placement of transfer print head 150 in the x-direction, as illustrated by horizontal line 126. Edges 119 and 121 can be used to determine the relative placement of transfer print head in the y-direction, as illustrated by vertical line 128. In some examples, transfer print head 150 may be shifted in the x-direction or in the y-direction relative to substrate 102 after optical pattern recognition. Shifting transfer print head in the x-direction or in the y-direction can improve the accuracy of alignment of transfer print head 150 with substrate 102. In some examples, alignment of transfer print head 150 to semiconductor device 114 is from about −200 nm to about +200 nm in the x-direction and from about-200 nm to about +200 nm in the y-direction.

The surface of substrate 102 is prepared to receive semiconductor device 114. In some examples, the surface of substrate 102 may include a material suitable for surface bonding and/or have preferred electrical, thermal, or thermochemical characteristics. Following alignment between alignment mark 117 and alignment mark 107, transfer print head 150 presses the semiconductor devices 114 on to substrate 102. This attaches semiconductor devices 114 to sliders 111 to form integrated semiconductor devices 116.

Various examples have been presented for the purpose of illustration and description. These and other examples are within the scope of the following claims.

What is claimed is:

1. A method of aligning a semiconductor device for use in a storage device, the method comprising the steps of:
   providing a semiconductor device on a first substrate, wherein the first substrate includes a first alignment mark;
   providing a recording head on a second substrate, wherein the second substrate includes a second alignment mark;
   providing a transfer print head, wherein the transfer print head includes a third alignment mark;
   aligning the transfer print head to the semiconductor device on the first substrate; and
   transfer printing the semiconductor device from the first substrate onto the second substrate, wherein the transfer printing includes aligning the third alignment mark on the transfer print head to the second alignment mark on the second substrate.

2. The method of claim 1, wherein providing the recording head on the second substrate includes aligning the recording head to the second alignment mark on the second substrate.

3. The method of claim 2, wherein aligning the recording head to the second alignment mark on the second substrate includes aligning the recording head to within −200 nm to +200 nm in an x-direction.

4. The method of claim 2, wherein aligning the recording head to the second alignment mark on the second substrate includes aligning the recording head to within −200 nm to +200 nm in a y-direction.

5. The method of claim 1, wherein aligning the transfer print head to the semiconductor device includes aligning the third alignment mark on the transfer print head to the first alignment mark on the first substrate.

6. The method of claim 5, wherein aligning the third alignment mark on the transfer print head to the first alignment mark on the first substrate includes aligning the transfer print head to within −200 nm to +200 nm in an x-direction.

7. The method of claim 5, wherein aligning the third alignment mark on the transfer print head to the first alignment mark on the first substrate includes aligning the transfer print head to within −200 nm to +200 nm in a y-direction.

8. The method of claim 1, wherein aligning the third alignment mark on the transfer print head to the second alignment mark on the second substrate includes aligning the transfer print head to within −200 nm to +200 nm in an x-direction.

9. The method of claim 1, wherein aligning the third alignment mark on the transfer print head to the second alignment mark on the second substrate includes aligning the transfer print head to within −200 nm to +200 nm in a y-direction.

10. The method of claim 1, wherein the recording head includes a waveguide.

11. The method of claim 1, wherein the semiconductor device comprises a laser diode.

12. The method of claim 1, wherein the first alignment mark includes at least one vertical edge.

13. The method of claim 1, wherein the first alignment mark includes at least one horizontal edge.

14. The method of claim 1, wherein the second alignment mark includes at least one vertical edge.

15. The method of claim 1, wherein the second alignment mark includes at least one horizontal edge.

16. The method of claim 1, wherein the third alignment mark includes at least one vertical edge.

17. The method of claim 1, wherein the third alignment mark includes at least one horizontal edge.

18. A method of aligning a laser diode for use in a storage device, the method comprising the steps of:

providing a laser diode on a first substrate, wherein the first substrate includes a first alignment mark;

providing a recording head comprising a waveguide on a second substrate, wherein the second substrate includes a second alignment mark;

providing a transfer print head, wherein the transfer print head includes a third alignment mark;

aligning the transfer print head to the laser diode, wherein the alignment includes aligning the third alignment mark on the transfer print head to the first alignment mark on the first substrate and wherein aligning the third alignment mark on the transfer print head to the first alignment mark on the first substrate includes aligning the transfer print head to within −300 nm to +300 nm in an x-direction and to within −300 nm to +300 nm in a y-direction; and transfer printing the laser diode from the first substrate onto the second substrate, wherein the transfer printing includes aligning the third alignment mark on the transfer print head to the second alignment mark on the second substrate and wherein aligning the third alignment mark on transfer print head to the second alignment mark on second substrate includes aligning the transfer print head to within −300 nm to +300 nm in an x-direction and to within −300 nm to +300 nm in a y-direction.

* * * * *